May 4, 1971     M. PESSES     3,577,231
PROCESS FOR PREPARING METAL SULFIDES
Filed Aug. 23, 1968
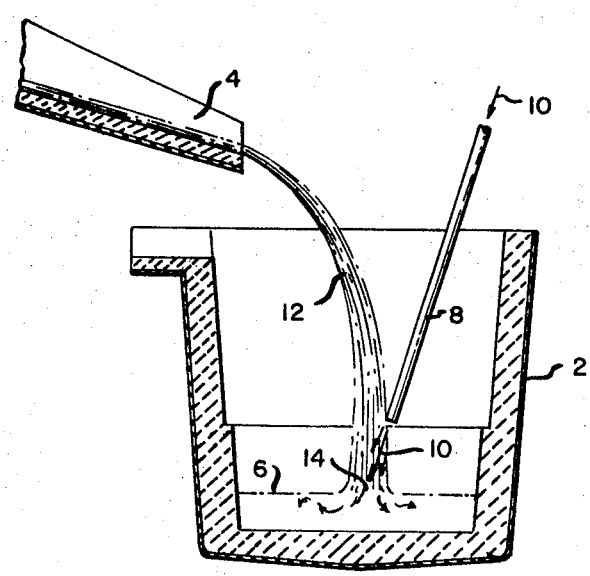
INVENTOR
Marvin Pesses 3,577,231
PROCESS FOR PREPARING METAL SULFIDES
Marvin Pesses, Youngstown, Ohio, assignor to
Mercer Alloys Corporation
Filed Aug. 23, 1968, Ser. No. 754,811
Int. Cl. C01g 3/12, 51/00, 53/00
U.S. Cl. 75—1   4 Claims

ABSTRACT OF THE DISCLOSURE

A process for producing a concentrate of metallic sulfides (especially nickel sulfide, copper sulfide and cobalt sulfide) from metallic scrap materials. The scrap materials are melted under a reducing atmosphere and injected with sulfur-bearing material during the pouring of the molten material from the melting furnace to a ladle. Thereafter, the molten mixture of sulfides is rapidly cooled and subdivided to produce a homogeneous, friable, synthetic ore.

---

This invention relates to a process for converting low grade metallic scrap materials to a concentrate of metal sulfides which is suitable for further processing to recover the elemental metals present therein. The metals of principal interest are nickel (Ni), copper (Cu) and cobalt (Co), although other metals may be similarly recovered.

During the processing of a metal from its ore or other source to a finished product, a certain amount of metal-bearing material is discarded. This material may take various forms including spills, spatters and skulls lost during smelting and refining operations; turnings, grindings and borings lost during finishing operations; and contaminated metals or alloys discarded after use as catalysts, batteries electrodes and the like. Heretofore, these metal-bearing materials have been considered as waste by the metals industry and few attempts have been made to recover the valuable metals from the body of this low grade waste material.

I have discovered a process for upgrading the metal content of these waste materials by separating therefrom the non-metallics (or swarf) and taking advantage of the affinity of metals for sulfur. The process of my invention produces a concentrate of metallic sulfides, particularly nickel sulfide (NiS), copper sulfide (CuS) and cobalt sulfide (CoS) which is adaptable for use as a starting material in a well-known leaching process to recover the elemental metals.

I provide a process for preparing a concentrate of metallic sulfides comprising discharging sulfur-bearing material into a downwardly flowing stream of de-oxidized molten metal consisting essentially of nickel, copper and cobalt, thereby forming a molten mixture of metallic sulfides, and thereafter quenching and subdividing said mixture. More particularly, I prefer to melt metallic scrap consisting essentially of alloys of nickel, copper and cobalt in the presence of a slag under a reducing atmosphere. I prefer to employ an electric furnace to carry out the melting operation. Upon completion of the melting step, the molten bath is de-oxidized by adding a de-oxidizing agent, preferably carbon, silicon or silicon carbide. Thereafter, I provide for pouring the molten metal into a vessel so as to form a pool of the metal in the bottom of the receiving vessel. My invention provides for continuing to pour the metal into the receiving vessel and discharging sulfur-bearing material to impinge upon the downwardly flowing stream of metal at the point where the stream contacts the pool of metal in the receiving vessel, thereby forming a molten mixture of metallic sulfides. I prefer to provide that the sulfur-bearing material comprises a mixture of pyrites and sulfur. Thereafter, the molten mixture of sulfides is simultaneously quenched and subdivided to form a friable concentrate.

In carrying out the process of my invention, I first prepare the material to be charged to the melting furnace. The make-up of the charge depends upon the type and composition of scrap or waste material available. A typical charge appears below in Table I:

TABLE I

| Material | Composition | Pounds charged | Pounds recovered |
|---|---|---|---|
| Crushed Monel turnings | 64% Ni, 32% Cu | 4,000 | 3,800 |
| Ni Resist No. 1 borings containing aluminum (Al). | 13% Ni, 10% Al, 5% Cu. | 3,500 | 2,975 |
| Mixed grindings | 40% Ni, 1.3% Al, 10% Co, 21% alumina (Al₂O₃). | 3,000 | 2,400 |
| Mixed spills, spatters and skulls. | 45% Ni, 2% Al, 11.5% Co. | 2,500 | 1,350 |
| Spent Ni catalyst | 40% Ni | 1,000 | 400 |
| Edison batteries | 15% Ni, 1% Cu | 2,000 | 1,400 |
| Total | | 16,000 | 12,325 |

Monel (a trade name of The International Nickel Co.) is a nickel-copper alloy used in applications requiring high strength and corrosion resistance. Ni Resist No. 1 is a high-nickel austenitic cast iron which is widely used for its corrosion resistance. Aluminum is present in the Ni Resist No. 1 borings as a result of the practice of machining aluminum-Ni Resist bimetallic assemblies. Mixed grindings are the residue from the machining of various high-nickel alloys. The grindings are a mixture of metallic particles, abrasive particles and particles of the binder used in the manufacture of grinding wheels. Mixed spills and spatters are large pieces of solidified metal which were lost during the processing and transfer of molten metal and are contaminated with sweepings, refractories and the like. Skulls are pieces of solidified metal remaining in a molten metal vessel after it has been emptied. Spent nickel catalyst is nickel oxide contaminated with fats and other organic materials as a result of its use in hydrogenation processes. Edison batteries are discarded wet-cell batteries having electrodes composed of nickel oxide, iron oxide and iron. Some copper is present in the discarded batteries because of the practice of attaching copper conductors thereto.

The materials in the charge are carefully weighed. The initial charge consists of Monel turnings and the "back-charge" consists of the balance of the materials listed in Table I plus certain slag forming materials discussed hereinafter. The materials in the "back-charge" are mixed together after weighing.

The initial charge is placed into a melting furnace capable of maintaining a reducing atmosphere. I prefer to use a direct arc electric furnace but other melting furnaces may be adapted for use in the process. The furnace has a basic lining, predominantly of magnesite brick. When the Monel turnings have become molten (at about 2400° F.), the "back-charge" is added to the furnace. The slag forming materials in the "back-charge" include fluorspar, lime, silica and sodium silicate in suitable quantities. The heat is continued to bring all of the charged materials to the molten state.

The step following the melt-down and tapping of the heat involves the addition of sulfur to form sulfides of the metals with which the invention is primarily concerned; namely, nickel sulfide, copper sulfide and cobalt sulfide. Sulfur will combine with any aluminum present in the molten bath to form aluminum sulfide as is well known in the art:

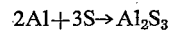

$$2Al + 3S \rightarrow Al_2S_3$$

Any aluminum sulfide formed during the sulfurizing step will go into the slag and this represents an economic loss of sulfur to the process. Therefore, aluminum should be oxidized in the melting furnace prior to the sulfurizing step to minimize sulfur loss to the slag. Oxidation of aluminum may be accomplished by introducing substantially pure oxygen into the molten bath through an oxygen lance by techniques old in the art. A less expensive method of oxidization is the charging of metal oxides such as nickel oxide (NiO) or iron oxide ($Fe_2O_3$). Aluminum will reduce these metal oxides to form alumina which enters the slag and is removed:

$$NiO + 2Al \rightarrow Al_2O_3 + Ni$$

$$Fe_2O_3 + 2Al \rightarrow Al_2O_3 + 2Fe$$

At the same time, elemental nickel is produced from the reduction of nickel oxide by aluminum and is free to combine with sulfur during the sulfurizing step which follows.

For each lb. of aluminum present in the charge, about 1½ lbs. of nickel oxide is charged. Approximately 3 lbs. of iron oxide ($Fe_2O_3$) is needed to remove one lb. of aluminum in the charge. In the charge shown in Table I above, there are about 420 lbs. of aluminum present. 540 lbs. of nickel oxide contained in the spent nickel catalyst will remove about 360 lbs. of this aluminum. The remaining 60 lbs. of aluminum will be removed by the $Fe_2O_3$ (about 200 lbs.) contained in the Edison batteries charged.

Slag practice during the melting operation fundamentally conforms to that which is well known in the electric furnace art. It is desirable to maintain a fluid slag and one that will give maximum protection to the refractory lining of the furnace. Fluidity is achieved by the addition of fluorspar which fluxes the lime. Refractory protection is accomplished by maintaining a neutral slag; that is, one in which the total amount of basic oxides balances that of the acid oxides. For example, where alumina is present, in the slag as a result of the oxidation of aluminum in the molten bath, the alumina will act as an acid in the presence of an excess of strong base such as lime. The ratio of alumina and lime should be maintained at about 1:1 to achieve a neutral slag. In the case where alumina is not present in the slag, silica ($SiO_2$) in an amount sufficient to balance the lime should be charged to achieve a neutral slag. The abrasives and other non-metallics (swarf) mixed with the grindings, turnings, and the like in the charge enter the slag when the charge becomes molten.

In charging the furnace, the oxidizing and reducing ingredients are pre-mixed to promote efficient reaction during the melting period. Since the molten bath is de-oxidized prior to tapping (as discussed below), the high silicon-bearing or high carbon-bearing materials are added at the end of the charging sequence to minimize the amount of de-oxidant additions at the end of the heat.

It has been found that chromium (Cr) concentrations above about 10% in the final heat tend to inhibit the sulfurizing of the metals of primary interest in the process, i.e. Ni, Cu and Co. Excess chromium is oxidized, preferably by oxygen lancing as described above. Lancing should be performed at relatively low temperatures, preferably as soon as there is a pool of molten metal, to achieve efficient oxidation. The oxidation of chromium is exothermic thereby causing an increase in the temperature of the bath with a corresponding reduction of external heat required to carry out the melting operation.

The molten bath is raised to a temperature of about 3200° F. The slag is tapped into a slag thimble and the bath is further cleansed of slag by manually drawing a steel skimmer over the surface of the bath. The bath is thoroughly de-oxidized by adding any well-known de-oxidizer such as carbon (C), silicon (Si) or silicon carbide (SiC). The temperature of the bath is again brought to 3200° F. and sampled by well-known techniques. In the heat utilizing the charge specified in Table I, the analysis of the molten bath was as follows:

| | Percent |
|---|---|
| Ni | 45.6 |
| Cu | 12.3 |
| Co | 3.9 |

The physical properties of the sample will permit one skilled in the art to determine the extent of de-oxidation of the bath; that is, the contour of the top of the sample will resemble the top of a fully-killed steel ingot.

The molten metal is tapped as rapidly as possible into a ladle. When a pool has developed in the ladle (preferably to a depth of about 12 inches), a lance carrying finely-divided iron pyrites (FeS) and sulfur (S) is positioned tangentially to the metal stream. A stream of sulfur-bearing materials carried by compressed air issues from the lance and is caused to impinge at the point of impact of the metal stream with the pool of molten metal in the ladle. Submergence of the lance into the pool of metal in the ladle should be avoided to prevent spattering and oxidation of the molten metal. The figure in the accompanying drawing schematically illustrates the positioning of the lance relative to the downwardly flowing stream of metal. Referring to the figure, a refractory-lined ladle 2 is positioned beneath the tapping spout 4 of the melting furnace (not shown). After a pool 6 has accumulated in the bottom of the ladle 2, a lance 8 or other conveyor means is positioned so that a stream of sulfur-bearing material 10 may be discharged into the downwardly flowing stream of molten metal 12 at the point 14 where the stream of metal 12 contacts the pool 6. The lance 8 is continuously re-positioned to keep pace with the increasing level of the pool 6 in the ladle 2.

In the heat made with the charge specified in Table I, 1480 lbs. of sulfur-bearing material (740 lbs. each of iron pyrites and sulfur) were injected into the molten metal. The rate of injection is adjusted so that the complete addition is made before the last 10 to 20 percent of the molten metal is tapped. It has been found that adequate sulfurizing does not occur when the injection of sulfur-bearing material is carried beyond that point in the tapping operation.

When using the tangential injection technique just described, the sulfur-bearing material is entrained in the downwardly moving stream of molten metal and carried below the quiescent level of the pool of molten metal in the ladle by the momentum of the stream. This results in good mixing of the sulfur with the molten metal and almost negligible sulfur losses, thereby eliminating the formation of noxious fumes of the sulfur oxides.

Prior practices of sulfurizing metals were attended by excessive sulfur losses through oxidation. These practices included (1) making bulk additions of native sulfur to the molten metal; (2) melting sulfur and homogenizing it with molten metal; and (3) injecting sulfur beneath the surface of a bath of molten metal. In the process of the present invention, the sulfur-bearing material is added to the molten metal cold and in a finely-divided state. There are no oxidation losses normally incident to the melting of sulfur. Further, the air carrier does not enter the body of the molten metal and cause oxidation of the metal and chilling of the molten bath.

The sulfurizing reaction is sufficiently exothermic that temperature losses which normally occur in transferring molten metal do not occur. A temperature of about 3200° F. is maintained during the sulfurizing step. Properly performed, the injection technique yields a homogeneous mixture of the sulfides of nickel, copper and cobalt with the balance iron sulfide and other metalloids.

This final step of the process of the invention involves the rapid cooling and subdividing of the mixture of metallic sulfides. For this, I prefer to employ a shotting apparatus wherein a blast of water is directed against a descending stream of the molten sulfides. Other cooling and subdivision techniques well known in the art may be used, however. The method which I find preferable is to pour the molten metal sulfide mixture onto an inclined, refractory lined trough known as a "tundish." The opposite end of the tundish is positioned over a water tank. High pressure water jets are directed at the stream of molten material as it descends from the end of the tundish thereby rapidly cooling and subdividing the material. The cooled particles fall to the bottom of the water tank and are picked up by any convenient conveyor means and transferred to storage bins.

The average size of the particles in the product is about minus 60 mesh. An analysis of the concentrate produced by the charge specified in Table I was as follows:

|    | Percent |
|----|---------|
| Ni | 40.3    |
| Cu | 10.7    |
| Co | 3.4     |
| S  | 8.0     |

The rapid cooling of the molten mixture of sulfides yields a homogeneous product having the best characteristics of naturally-occurring lateritic nickel ores; namely, grindability, high solution rate and the like.

This concentrate has been found useful as a starting material in a refining process wherein the nickel, copper and cobalt in the concentrate are selectively leached by an ammonia solution. The concentrate is competitive with and of much higher grade than the normal nickel-copper ores heretofore used in this hydrometallurgical refining process. Further, the synthetic ore produced by the process of the invention may be processed with the same equipment and at the same rate as naturally-occurring lateritic nickel ore.

I claim:

1. A process for preparing a homogeneous concentrate of metallic sulfides, said concentrate being adaptable for use as a feed material for a leaching process to recover elemental metals therefrom, comprising the steps of:
   (A) melting metallic scrap consisting essentially of alloys of nickel, copper and cobalt in the presence of a slag under a reducing atmosphere;
   (B) de-oxidizing the molten metal produced in step (A);
   (C) adding sulfur-bearing material to said molten metal, thereby forming a mixture of sulfides consisting essentially of nickel sulfide, copper sulfide and cobalt sulfide; and
   (D) simultaneously quenching and subdividing said mixture of sulfides to form irregularly shaped particles of said concentrate.

2. A process as recited in claim 1 wherein:
   said sulfur-bearing material is added to said molten metal by discharging a mixture of finely-divided pyrites and sulfur tangentially into a descending stream of said molten metal.

3. A process for preparing a friable, homogeneous nickel concentrate adaptable for use as the feed for a leaching process to recover elemental nickel therefrom, comprising the steps of:
   (A) melting metallic scrap consisting essentially of alloys of nickel in the presence of a slag under a reducing atmosphere;
   (B) adding sulfur-bearing material to said molten metal to form a molten mixture consisting essentially of nickel sulfide; and
   (C) simultaneously quenching and subdividing said molten mixture to form irregularly shaped particles of said concentrate.

4. A process as recited in claim 3 wherein:
   said sulfur-bearing material is added to said molten metal by discharging a mixture of finely-divided pyrites and sulfur tangentially into a descending stream of said molten metal.

References Cited

UNITED STATES PATENTS

| | | | |
|---|---|---|---|
| 810,572 | 1/1906 | Savelsberg | 75—1 |
| 1,691,207 | 11/1928 | Pacz | 75—83 |
| 2,217,981 | 10/1940 | Hallows | 75—78 |
| 2,512,578 | 6/1950 | Jordan | 75—53 |
| 3,232,742 | 2/1966 | Zimmerley et al. | 75—.5AA |
| 3,258,328 | 6/1966 | Goss et al. | 75—53 |
| 3,260,591 | 7/1966 | Brown, Jr., et al. | 75—53 |
| 3,331,680 | 7/1967 | Leupold | 75—53 |
| 3,424,574 | 1/1969 | Irani | 75—53 |
| 3,462,264 | 8/1969 | Richards et al. | 75—76X |
| 3,481,020 | 12/1969 | Winter et al. | 75—63X |

FOREIGN PATENTS

| | | | |
|---|---|---|---|
| 1,059,476 | 2/1967 | Great Britain | 75—2 |

ALLEN B. CURTIS, Primary Examiner

U.S. Cl. X.R.

23—134, 135; 75—63, 76, 82